V. W. PAGE.
VARIABLE SPEED MECHANISM.
APPLICATION FILED JAN. 16, 1913.

1,223,514.

Patented Apr. 24, 1917.
2 SHEETS—SHEET 1.

V. W. PAGE.
VARIABLE SPEED MECHANISM.
APPLICATION FILED JAN. 16, 1913.

1,223,514.

Patented Apr. 24, 1917.
2 SHEETS—SHEET 2.

WITNESSES:
Harry W. Tuttle
Harold A. Kingsbury.

INVENTOR:
Victor W. Pagé,
BY
Gales G. Moore
his ATTORNEY.

UNITED STATES PATENT OFFICE.

VICTOR W. PAGÉ, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

VARIABLE-SPEED MECHANISM.

1,223,514. Specification of Letters Patent. Patented Apr. 24, 1917.

Application filed January 16, 1913. Serial No. 742,322.

*To all whom it may concern:*

Be it known that I, VICTOR W. PAGÉ, a citizen of the United States, residing at Bristol, county of Hartford, State of Connecticut, have invented a certain new and useful Variable-Speed Mechanism, of which the following is a full, clear, and exact description, such as will enable others skilled in the art to which it appertains to make and use the same, reference being had to the accompanying drawings, forming part of this specification.

My invention relates to variable speed mechanisms and more particularly to hubs.

Previously, in attempts to construct variable speed free engine hubs for motorcycles and the like, difficulty has been experienced in attempting to provide a device having its driving connections so arranged and its mechanism so compact as to adapt the device for installation in the driving wheel without alteration to the wheel and the vehicle frame.

One object of my invention is to provide a variable speed and free engine hub whose parts are so arranged as to make the device of a size to permit of its being laced into the rear wheel and placed in the frame of a motorcycle of the ordinary type without alteration to the frame.

Another object is to provide a device of the character indicated which, while strong and efficient, has its parts well protected and also arranged with great compactness.

To these ends and also to improve generally upon devices of the character indicated, my invention consists in the various matters hereinafter described and claimed.

Figure 1:
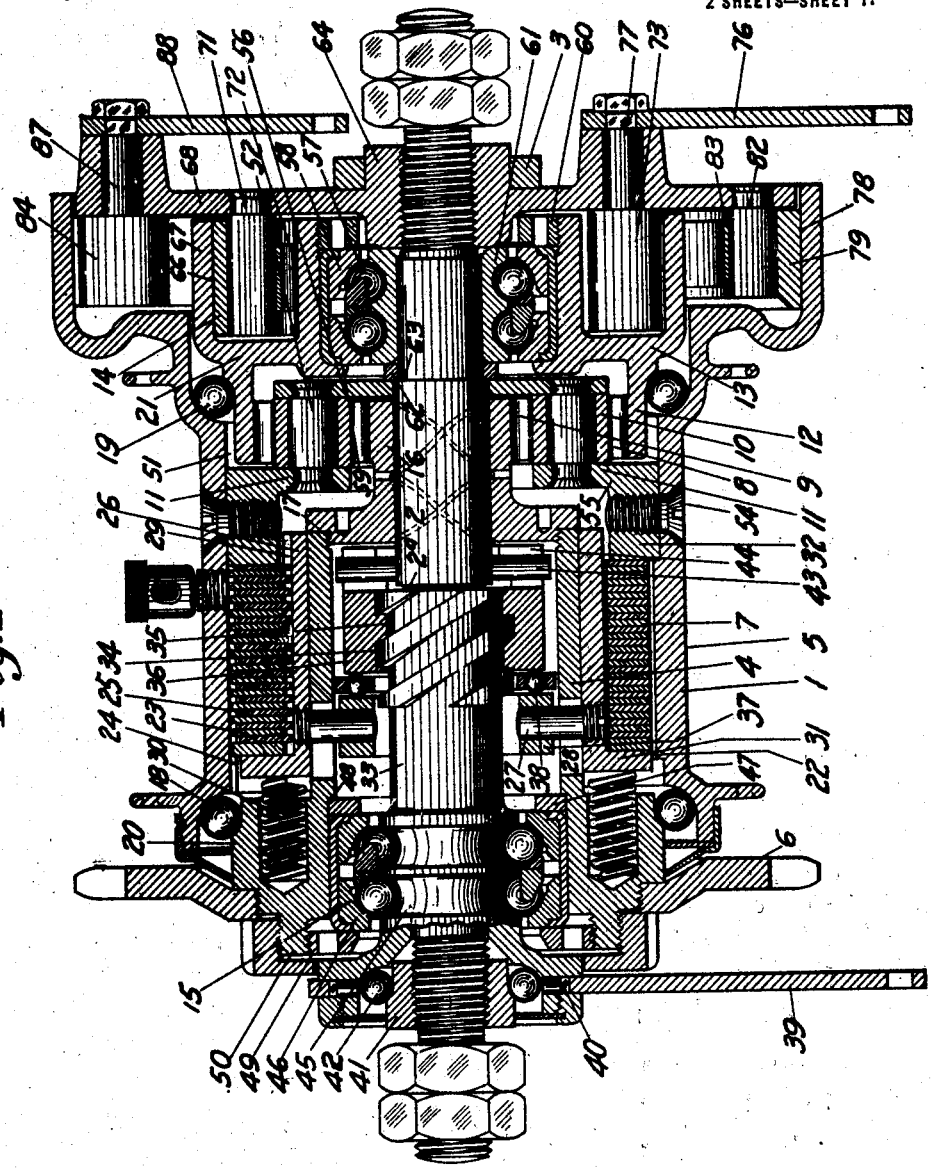
Figure 2:
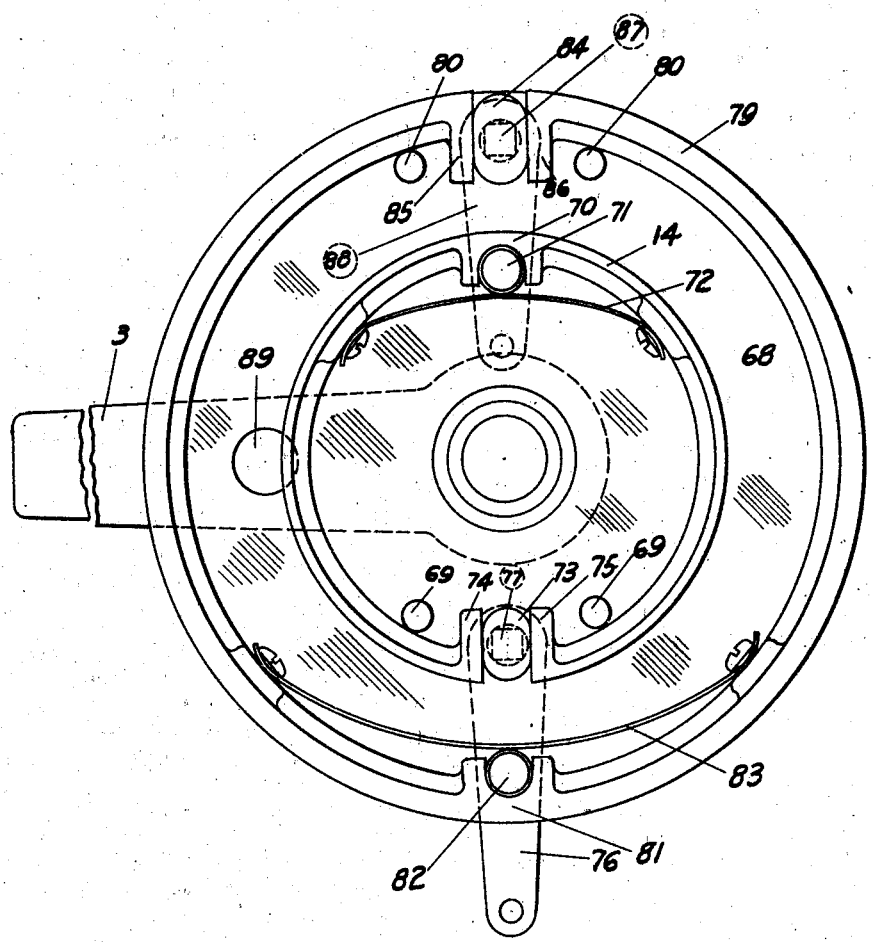

In the accompanying drawings:

Figure 1 is a longitudinal diametrical section of a hub embodying my invention; and Fig. 2 is a face view of the support supporting the brakes and showing the brakes mounted thereon.

In the illustrated embodiment of my invention there is shown a hub, designated generally as 1. The axle 2 of the hub is adapted to be nonrotatably connected with the frame of a vehicle as by means of the anchor arm 3. The hub 1 comprises the inner driver sleeve 4 and the outer hub, or spoke carrying, shell 5 spaced from and surrounding the sleeve 4. Both the driver sleeve 4 and the hub shell 5 are rotatably mounted with respect to each other and to the axle.

The driver sleeve 4 may be driven, as from the engine (not shown), through the sprocket 6, and the motion thus imparted to the sleeve may be transmitted to the hub shell at different speed ratios, or the sleeve and shell may, if desired, run free of each other.

The direct high speed driving connection is preferably provided, as in the illustrated device, by the disk clutch 7, preferably arranged in the space between the sleeve 4 and the shell, and which, when active, prevents rotation of the hub shell with respect to the driver sleeve. When the clutch 7 is released the direct driving connection is inactive and, unless the slow speed mechanism be thrown in, the shell and sleeve run free each of the other.

An indirect slow speed driving connection is preferably provided, as in the illustrated device, by the epicyclic or planetary drive designated generally as 8. The main external gear 9 of the drive 8 is carried by the driver sleeve, the planet gears 10 by the support 11 attached to the hub shell, and the outer internal gear 12 by the rotatively mounted carrier 13, all preferably arranged within the hub shell. The carrier 13 may be held from rotation by the brake 14.

As here shown, the rotary parts of the mechanism are supported upon the main bearings 15 and 57, both drives are arranged between the bearings, and but little structure, and no structure of large diameter or width, such as clutch casings, drive casings or the like, lies, to any material extent, outside (longitudinally of the axle) of the bearings. Preferably the bearings 15 and 57 are spaced apart but the standard distance adopted for motorcycles. It will be seen, therefore, that the hub is of such dimensions as to permit of its installation in the frame of a motorcycle without alteration of the rear forks or other parts of the frame.

In operation, with the carrier 13 free to rotate and the clutch 7 active, the driving of the shell by the driver is direct; with the carrier free to rotate and the clutch released, the driver sleeve and hub shell are disconnected and the engine runs free of the shell; and with the carrier stationary and the clutch released the planetary gears 10 are turned about their axes by the main gear 9 and travel upon the stationary internal gear, carrying the support 11 and shell 5 with them so that the driving of the shell by the driver is indirect and a reduction of speed is effected between the driver sleeve and the hub shell.

As illustrated, the driving member or sleeve 4 is supported, in addition to its support by the before mentioned thrust and radial bearing 15, by a support, as 16, bearing directly upon the axle 2 and rigidly connected with the sleeve at its end, as indicated at 17. The driven member, here shown as the before referred to driven element, hub shell or wheel hub 5, is preferably supported about the driving element 4 as by anti-friction members 18 and 19 traveling, respectively, upon a support 20 of comparatively large diameter, which may conveniently be an enlargement of the element 4 as shown, and a support 21 also of comparatively large diameter which may conveniently be provided by the outer surface of the gear 12, as shown.

By the above recited construction there is provided a space 22 between the members 4 and 5 in which may, conveniently for compactness, be received the before referred to clutch 7. As illustrated, this clutch is of the friction disk type and, in it, certain of the disks, as 23, are slidably and non-rotatably attached to the shell 5, as by keying at 24, while the intermediate disks, as 25, are slidably and non-rotatably connected to the sleeve 4.

As illustrated, the latter connection is provided by slidably keying, as at 29, the disks 25 to a sleeve or element 26 which element is, in turn, slidably and non-rotatably connected to the driving member by the pins, or members, 27 fixed to the sleeve 26 and projecting through the slots 28 in the driver sleeve.

The clutch is preferably normally active and therefore the clutch disks are normally held in driving engagement as by expanding springs 30 conveniently carried by the driver sleeve 4 and expanding against a laterally shiftable partition 31. The partition is forced against the outermost clutch disk 23 and, so, the disks are pressed against each other, and the innermost disk is forced against the abutment 32. The partition 31 is carried by the sleeve 26 and, as shown, the sleeve extends from the partition longitudinally of the series of clutch disks.

I preferably provide means for releasing the clutch and, as here shown, a shifting member or actuator, shown as an oscillatable sleeve 33, is carried by the axle 2. A portion of this sleeve carries threads 34 to mesh with corresponding threads 35 upon a laterally shiftable transfer member 36. The member 36 is adapted for operative connection with the before referred to pins 27 connected to the sleeve 26. It will be seen that the longitudinally extending sleeve 26 allows of the pins 27 being placed to one side of the partition 31 and radially beneath the clutch disks. Thus the means for actuating the partition may be put radially beneath the clutch disks, giving a compact structure.

The operative connection between the transfer member 36 and the pins 27 may be conveniently effected by the ring 37 and the ball thrust bearing 38. The sleeve 33 may be oscillated by the lever 39 rigidly attached thereto as by the pins 40. Longitudinal movement of the sleeve 33 may be restricted by the cone 41 of the antifriction bearing 42 and the shoulder 2ª of the axle. Rotative movement of the transfer element 36 may be prevented as by the pin 43 carried by the axle and projecting into the slot 44 of the transfer element.

Thus, when the parts are as illustrated, the clutch 7 is active and the driving of the shell by the driver is direct. When the lever 39 is oscillated clockwise (viewed from the left) the transfer member travels to the left (on the threads 34) and the sleeve 26 is moved to the left to compress the springs 30 and relieve the clutch disks from pressure whereby the clutch is released and the high speed driving connection is rendered ineffective.

Preferably, and as here shown, sleeve 33 carries, fixed with respect thereto, as integral therewith, the inner race member 45 of the antifriction thrust and radial bearing 15. In this way the actuator 33 also serves as a support of a race member of the bearing 15 tending to simplicity, and also the sleeve is conveniently extended into the hub shell. Moreover, the thrust of the springs 30 is taken by the cone 41 which cone also serves to prevent lateral shifting of the actuator. Also the sleeve 33 is secured within the hub shell resulting in compactness.

The connection for preventing lateral movement between the driving element 4 and the outer member 46 of the antifriction bearing 15 may conveniently be effected by the washer 47 abutting the shoulder 48 of the driving element and the abutment or nut 49 carried by the projection 50 of the driving element.

Preferably, and as here shown, the driving element carries with it the before referred to support 16 of reduced diameter and, as shown, this support is conveniently formed to provide the before referred to main external gear 9 of the slow speed planetary drive. In this way a large annular space 51 is provided between the outer hub shell, which latter preferably extends longitudinally of the axle beyond the sleeve 4, and the main gear, within which space may be received the planet gears 10 and the internal gear 12. This construction is conducive to compactness, since in it both the planetary drive and the direct drive as well as the transfer member are placed within the hub shell and between the bearings 15 and 57.

As here shown, the planet gears are carried upon studs 52 connected to the outer hub shell. The studs 52 are shown as carried by the before referred to support 11 here shown as a ring peripherally attached to the shell 4 as by screws 54. Conveniently the abutment 32 provides as a part thereof, and in a single piece therewith, the ring 11, as indicated at 55 and thus serves both as an abutment for the clutch at one face and as a support for the planet gears at the other face, thus tending to simplicity and compactness. If desired the studs may be additionally supported by means such as the ring 56.

As here shown the outer internal gear 12 is carried by the before referred to carrier 13 rotatably mounted upon the axle 2 as by the before referred to antifriction bearing 57. The outer race member 58 of the bearing 57 may conveniently be held in position by the shoulder 59 of the carrier and the nut 60 threaded to the carrier, while the inner race member 61 may be held in position by the washer 62 and the shoulder 63 of the axle and by the member 64.

Suitable means, here shown as the before referred to brake 14, are provided for holding the carrier 13 against rotation thereby to throw in the slow speed drive. The brake is here shown as in the character of an expansible band, in position to be expanded into braking contact with the surface 66 of a member 67 connected to the carrier 13 and which may conveniently be a part thereof.

The band 14 is conveniently supported upon the support or plate 68. The connection between the support 68 and the brake band is preferably effected by means of a plurality of supporting pins 69, and by the jawed lug 70 upon the brake and embracing the pin 71 upon the support. The spring 72 normally assists in holding the band from braking contact.

I prefer to expand the band by means of an oscillatively mounted cam 73 placed between the spaced ends 74, 75 of the brake band. This cam when oscillated, as by the lever 76 attached to the cam by the carrying stud 77 conveniently mounted on the support, spreads the ends 74, 75 apart and presses the band into braking engagement. During such expansion the spring 72 is tensioned and the lug 70 slides upon the pin 71 bringing practically the entire braking surface of the band into contact with the surface 66.

I prefer t provide a brake for the hub shell. Such rake is here shown as similar to the brake for the carrier 13. This second brake coöperates with the surface 78 of the hub shell and comprises a band 79 carried upon the support 68, and concentric with the band 14, by pins 80, 80, lug 81 and the pin 82. The band is held by the spring 83 and is expanded by means of the cam 84 located between the spaced ends 85, 86, and mounted upon the stud 87 which latter may be moved by means of the lever 88 under the control of the rider.

The support 68 may be held from rotation by the before referred to anchor arm 3 for anchorage to the vehicle frame (not shown) and held fast to the support 68 as by the pin 89.

By mounting both brakes upon a single support the structure is simplified, as two separate supports are eliminated resulting in compactness and simplicity of parts.

It will be seen that I have provided a variable speed and free engine hub which is very compact, simple, and strong and capable of easy installation in any of the usual forms of wheel without alteration to the frame of the vehicle. It will also be seen that I have provided a hub of this character all of the parts of which are assembled upon the axle and held thereon whereby the device, as a unit, may be handled, installed in and removed from the frame without disturbing its adjustment. And it will also be seen that I have provided a device of the character indicated which, while strong and efficient, has its parts well protected and also arranged with great compactness.

Having thus described my invention, what I claim as new and desire to secure by Letters Patent is:

1. In a cycle hub, a driving member, a driven hub shell member, a direct driving connection and an indirect driving connection therebetween, and common means carried by one of said members for supporting an element of said direct connection and for supporting an element of said indirect connection; substantially as described.

2. In a cycle hub, the combination with a driving member, a driven hub shell member, a friction disk direct drive for connecting said members comprising means subjecting said disks to thrust, and an indirect driving connection between said members, of a common means for supporting said disks under such thrust and for supporting an element of said indirect connection; substantially as described.

3. In a device of the character indicated, the combination with a driving member, a driven member, a direct driving connection therebetween and an indirect planetary drive for connecting said members, of common means for supporting an element of said direct connection and for supporting a planet gear of said indirect drive; substantially as described.

4. In a cycle hub, the combination with a driving member, a driven hub shell member, a friction disk drive for connecting said members and an indirect driving connection between said members; such friction disk drive comprising a series of disks slidably mounted with respect to each other and thrust means for forcing said disks to slide; of a common means for limiting the sliding of said disks under the action of said thrust means and for supporting an element of said indirect driving connection; substantially as described.

5. In a multi-speed cycle hub, an axle, a driving member and a driven spoke-carrying hub shell member rotatable about said axle, two optionally active driving connections, of different speed ratios, between said members, one of said connections including gearing and said connections when inactive permitting said driving member to continuously rotate forwardly free of said hub shell, said hub shell receiving said driving member and said connections, and a radially extending member for supporting, at the one side wall thereof, an element of one of said connections and for supporting, at the other side wall thereof, a gear of the gear-including connection; substantially as described.

6. In a device of the character indicated, a generally cylindrical driving member, a generally cylindrical driven member surrounding and spaced from said driving member, a driving clutch for connecting said members arranged in said space and having a portion subjected to thrust, a planetary drive for connecting said members and in said space, and an annular abutment in said space and carried with said driven member for supporting said portion of said clutch under such thrust, said abutment being connected to and serving as a support for a planet gear of said drive; substantially as described.

7. In a device of the character indicated, a generally cylindrical driving member, a generally cylindrical driven member surrounding and spaced from said driving member, a friction disk clutch for connecting said members comprising annuli received in said space, surrounding said driving member and slidable relative thereto and thrust means for forcing said disks into contact and tending to slide the same, a planetary drive for connecting said members and received in said space, and an annular abutment for said clutch disks for limiting sliding thereof and in said space and carried with said driven member, said abutment being connected to and serving as a support for a planet gear of said drive; substantially as described.

8. In a device of the character indicated, a generally cylindrical driving member, a generally cylindrical driven member surrounding and spaced from said driving member, a friction disk clutch for connecting said members comprising annuli received in said space, surrounding said driving member and slidable relative thereto and thrust means for forcing said disks into contact and tending to slide the same, a planetary drive for connecting said members and received in said space, and an annular abutment for said disks to limit sliding thereof, received in said space, attached at its periphery to said driven member and located between said clutch and said drive, the one face thereof being in contact with one of said disks and the other face thereof carrying supported thereon a planet gear of said drive; substantially as described.

9. In a device of the character indicated, an axle, a sleeve mounted upon said axle and spaced therefrom, a hub shell surrounding said sleeve and axle, spaced therefrom, and extending longitudinally of said axle beyond said sleeve, a controllable direct driving connection between said sleeve and shell and in the space therebetween, controlling means for said connection having a portion thereof received in the space between said sleeve and said axle, a planetary indirect drive for connecting said sleeve and shell and encompassed by said shell, and a support carried with said sleeve and of less diameter than the same and providing the main gear of such drive; substantially as described.

10. In a device of the character indicated, an axle, a sleeve mounted upon said axle and spaced therefrom, a hub shell surrounding said sleeve and axle, spaced therefrom, and extending longitudinally of said axle beyond said sleeve, a controllable direct driving connection between said sleeve and shell and in the space therebetween, controlling means for said connection having a portion thereof received in the space between said sleeve and said axle, and a planetary indirect drive for connecting said sleeve and shell such drive being located beyond the sleeve longitudinally of said axle and within said shell; substantially as described.

11. In a device of the character indicated, the combination with a driving member and a driven member, one of said members being arranged about and surrounding the other, of a friction disk drive and a planetary drive for connecting said members, both said drives being arranged within said surrounding member; substantially as described.

12. In a device of the character indicated, the combination with an axle, a driving member and a driven member mounted upon said axle, one of said members being arranged about, spaced from and surrounding the other and of greater length longitudinally of said axle than such other member, of a plurality of separate driving connections for said members, one of said connections comprising a friction disk clutch and being located in the space between said members, and another of said connections being located between said axle and said surrounding member and beyond said surrounded member longitudinally of said axle, and received within said surrounding member; substantially as described.

13. In a device of the character indicated, the combination with a driving member and a driven member, one of said members being arranged about, spaced from and surrounding the other, of a friction disk drive for connecting said members arranged in the space therebetween, and a planetary drive for connecting said members arranged within said surrounding member; substantially as described.

14. In a hub, the combination with an axle and a hub shell carried thereby, of an element for driving said shell, a plurality of driving connections whereby said driving element may drive said shell at selected speed ratios and whereby said driving element may continuously rotate forwardly free of said shell, said element and said connections being carried by said axle and received within said shell, and means upon said axle for holding said shell and said element and said connections assembled upon said axle; substantially as described.

15. In a cycle hub, the combination with an axle adapted for mounting in the frame of a cycle and a spoke-carrying hub shell rotatably mounted upon said axle, of an element rotatably carried by said axle and for driving said shell, a plurality of driving connections carried by said axle and whereby said driving element can drive said shell at selected speed ratios and whereby said driving element may continuously rotate forwardly free of said shell; said element and said connections being received within said shell; and means upon said axle for holding said shell, said element and said connections assembled with each other and upon said axle; substantially as described.

16. In a device of the character indicated, a driving member, a driven member, a controllable direct driving connection therebetween comprising thrust means for maintaining said connection active and thrusting against one of said members, an indirect driving connection between said members, means for supporting portions of each of said connections and connected to one of said members, means for controlling said controllable connection, thrust sustaining means for supporting a portion of said controlling means, and means for connecting said member subjected to thrust and said portion and for transmitting such thrust to said thrust sustaining means; one of said members, said thrust means, supporting means, connecting and transmitting means, said connections and said portion being received in and surrounded by said other member; substantially as described.

17. In a multi-speed device, an axle, a driver sleeve, a hub shell, said sleeve being rotatable about said axle and said shell being rotatable about said sleeve, a high speed and a low speed driving connection between said sleeve and shell, one of said connections being releasable and comprising thrust means for maintaining such connection active, and releasing means for such connection including an oscillatable member, and a thrust bearing for said oscillatable member, there being a connection between said thrust means and said oscillatable member for transmitting the thrust of such means to said bearing; substantially as described.

18. In a multi-speed device, an axle, a driver sleeve, a hub shell, said sleeve being rotatable about said axle and said shell being rotatable about said sleeve, a high speed and a low speed driving connection between said sleeve and shell, one of said connections being releasable and comprising a thrust means for maintaining the connection active and abutting and thrusting against said sleeve, means for releasing such connection and comprising an oscillatable sleeve carried upon said axle, a thrust bearing connecting said driver sleeve and oscillatable sleeve, and a thrust bearing for supporting said oscillatable sleeve; substantially as described.

19. In a multi-speed device, an axle, a driver sleeve, a hub shell, said sleeve being rotatable about said axle and said shell being rotatable about said sleeve, a high speed and a low speed driving connection between said sleeve and shell, one of said connections being releasable and comprising a thrust spring for maintaining the connection active and abutting and thrusting against said sleeve, means for releasing such connection and comprising an oscillatable sleeve carried upon said axle, a thrust bearing connecting said driver sleeve and oscillatable sleeve, and a thrust bearing for supporting said oscillatable sleeve; substantially as described.

20. In a multi-speed device, a driving member, a driven member, and a plurality of driving connections, of different speed ratios, between said members; one of said connections being a friction plate clutch comprising a longitudinally extending set of friction plates slidably and non-rotatably related to the driving member and a similar set similarly related to the driven member, thrust means for controlling the activity of the clutch, a longitudinally movable partition disposed between said thrust means and certain of the plates of one of said sets, an element fixed to said partition with respect to longitudinal sliding and extending longitudinally therefrom and for a distance along the length of the sets of friction plates, a member fixed to said element with respect to longitudinal sliding and longitudinally spaced from said partition, and means operatively related to such member for longitudinally moving the same to control the activity of said thrust means; substantially as described.

21. In a multi-speed device, a driving member, a driven member, and a plurality of driving connections, of different speed ratios, between said members; one of said connections being a friction plate clutch comprising a set of friction plates slidably and non-rotatably related to the driving member and a similar set similarly related to the driven member, thrust means for controlling the activity of the clutch, an element slidable and non-rotatable relative to one of said members and by which the plates correlated with such member are carried, a partition carried by said element and fixed against longitudinal sliding thereon and disposed between said thrust means and certain of the plates of one of said sets, a member fixed to said element with respect to longitudinal sliding, and means operatively related to said member for longitudinally moving the same to slide the element, and thereby the partition, thereby to control the activity of said thrust means; substantially as described.

22. In a multi-speed device, an axle, a generally cylindrical slotted driving member rotatably carried upon said axle and spaced therefrom, a driven shell rotatably carried upon said axle and surrounding said driving member and spaced therefrom, a clutch comprising sliding friction disks for connecting said driving member and said shell and received in the space therebetween, an abutment for said disks, resilient means for forcing said disks into contact and toward said abutment, means for controlling the engagement of said disks; such means comprising a sleeve upon the exterior of said driving member and having a portion disposed between said resilient means and said disks, a pin carried by said sleeve and projecting through the slot of said driving member to the interior of such member to slidably and non-rotatably connect said sleeve with said driving member, a screw-threaded member oscillatably carried upon said axle and projecting into the interior of said driving member, a nut carried upon such member and operatively connected with said pin; and an indirect driving connection between said driving member and said shell also mounted upon said axle; substantially as described.

23. In a multi-speed device, an axle, a driver member, a driven member, said members being rotatably carried upon said axle and said driven member being provided with a braking surface, a direct driving connection and a speed-change driving connection between said members, said speed-change connection comprising a gear adapted when held stationary to control the activity of such connection, a carrier for said gear rotatably carried upon said axle and provided with a braking surface adjacent the braking surface of said driven member, a support rigidly carried upon said axle and adjacent said braking surfaces, a pair of brakes carried upon said support and coöperative with said braking surfaces, means for controlling said brakes, and means for controlling said direct connection; substantially as described.

24. In a multi-speed device, an axle, a driver member, a driven member, said members being rotatably carried upon said axle and said driven member being provided with an annular braking surface, a direct driving connection and a speed-change driving connection between said members, said speed-change connection comprising a gear adapted when held stationary to control the activity of such connection, a carrier for said gear rotatably carried upon said axle and provided with an annular braking surface adjacent the braking surface of said driven member, a support rigidly carried upon said axle and adjacent said braking surfaces, a pair of annular band brakes carried upon said support and coöperative with said braking surfaces, means for controlling said brakes, and means for controlling said direct connection; substantially as described.

25. In a multi-speed device, an axle, a driver member, a driven member, said members being rotatably carried upon said axle and said driven member being provided with an annular braking surface, a direct driving connection and a speed-change driving connection between said members, said speed-change connection comprising a gear adapted when held stationary to control the activity of such connection, a carrier for said gear rotatably carried upon said axle and provided with an annular braking surface adjacent and concentric with the braking surface of said driven member, a support rigidly carried upon said axle and adjacent said braking surfaces, a pair of annular band brakes carried upon said support and concentric with respect to each other and coöperative with said braking surfaces, means for controlling said brakes, and means for controlling said direct connection; substantially as described.

In testimony whereof, I hereunto affix my signature, in the presence of two witnesses.

VICTOR W. PAGÉ.

Witnesses:
FREDERICK A. HOTCHKISS,
LUCY A. LANDRY.

Copies of this patent may be obtained for five cents each, by addressing the "Commissioner of Patents, Washington, D. C."